P. F. Lewis,
Churn.
No. 89,155.      Patented Apr. 20, 1869.
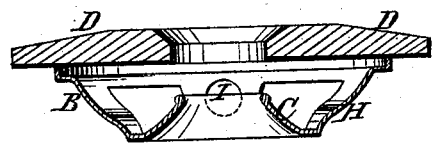
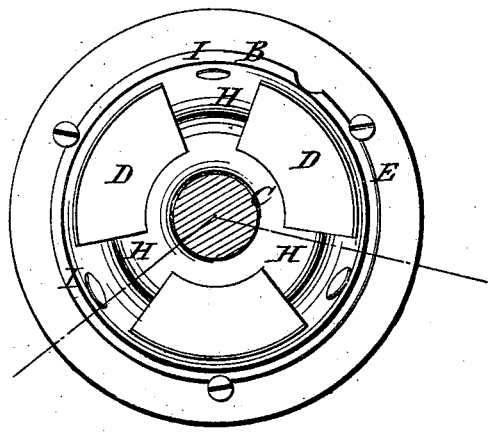
Witnesses.
Chas. Nida
Wm A Morgan
Inventor.
P. F. Lewis.
per Munn & Co
Attys.

P. F. LEWIS, OF COLUMBUS, PENNSYLVANIA.

Letters Patent No. 89,155, dated April 20, 1869.

IMPROVEMENT IN CHURNS.

The Schedule referred to in these Letters Patent and making part of the same.

*To all whom it may concern:*

Be it known that I, P. F. LEWIS, of Columbus, in the county of Warren, and State of Pennsylvania, have invented a new and improved Cream-Saver; and I do hereby declare that the following is a full, clear, and exact description thereof, which will enable others skilled in the art to make and use the same, reference being had to the accompanying drawings, forming part of this specification.

This invention relates to improvements in attachments to churn-covers, designed to prevent the cream from being delivered upon the top of the cover from the handle.

It consists in attaching to the under side of the cover a cup, having a centrally perforated conical elevation at the bottom, and otherwise constructed as hereinafter described.

Figure 1 represents a sectional elevation of my improvement; and

Figure 2 represents a plan of the bottom of a cover with my improvement applied.

Similar letters of reference indicate corresponding parts.

A represents the ordinary cover of such churns, as above mentioned.

B represents a cup formed of sheet-metal, having a conical elevation C at the bottom, with a hole in the centre thereof, which is coincident with the hole in the cover A, when the dish is secured to the cover, and through which the handle of the dasher works.

Large openings, D, are formed in the side of the cup, extending to the bottom thereof, and smaller round openings are made in the ribs, near their junction with the rim of the cup.

By this arrangement, the cream adhering to the handle of the dasher, which would be delivered to the cover, is taken off by the bottom of the cup, and that part of it, which is received on the upper side of the bottom, readily runs back again through the opening D.

The smaller holes are intended to afford a free circulation of air, in case the larger openings become choked by the cream passing through them.

I am aware of the patent granted to E. Cox, No. 58,952, dated April 17, 1866, but as it constitutes no part of my invention, I claim nothing therein shown; but

Having thus described my invention,

I claim as new, and desire to secure by Letters Patent—

The construction of the cup B, provided with the circular rim E and the concave centrally-perforated bottom C, and having the three sector-shaped openings D, extending between the said rim and bottom round alternately with the ribs H, provided with the air-openings I, as set forth.

P. F. LEWIS.

Witnesses:
 JONES SMITH,
 G. W. PARDEE.